(12) United States Patent
Cho et al.

(10) Patent No.: US 9,609,255 B2
(45) Date of Patent: Mar. 28, 2017

(54) CMOS IMAGE SENSOR HAVING A TIMING SIGNAL GENERATOR IMPLEMENTED USING BOTH HARDWARE AND SOFTWARE USING THE SAME

(71) Applicant: SK hynix Inc., Gyeonggi-do (KR)

(72) Inventors: Keun-Soo Cho, Gyeonggi-do (KR); Kyung-Dong Yoo, Gyeonggi-do (KR); Sang-Dong Yoo, Gyeonggi-do (KR); Jong-Suk Lee, Gyeonggi-do (KR); Jung-Hyun Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 157 days.

(21) Appl. No.: 14/305,873

(22) Filed: Jun. 16, 2014

(65) Prior Publication Data

US 2015/0198970 A1    Jul. 16, 2015

(30) Foreign Application Priority Data

Jan. 14, 2014   (KR) .................. 10-2014-0004553

(51) Int. Cl.
*G06F 1/00* (2006.01)
*H04N 5/376* (2011.01)
*H04N 5/353* (2011.01)

(52) U.S. Cl.
CPC ........... *H04N 5/3765* (2013.01); *H04N 5/353* (2013.01)

(58) Field of Classification Search
CPC .. G06F 1/00; G06F 1/14; H04N 5/353; H04N 5/3765

USPC ..... 382/103, 312, 167; 348/222.1, 300, 248, 348/272, 77, 229.1, 294; 250/208.1; 340/10.34; 717/127; 205/215
See application file for complete search history.

(56) References Cited

U.S. PATENT DOCUMENTS

| 6,750,876 | B1* | 6/2004 | Atsatt | H04N 5/23293 345/204 |
| 7,092,029 | B1* | 8/2006 | Medwick | H04N 5/2354 348/229.1 |
| 7,148,925 | B2* | 12/2006 | Osada | H04N 5/232 348/272 |
| 8,035,709 | B2* | 10/2011 | Kinoshita | H04N 5/359 348/248 |
| 2002/0067303 | A1* | 6/2002 | Lee | H04N 3/155 341/184 |
| 2005/0128312 | A1* | 6/2005 | Fredlund | H04N 1/02409 348/222.1 |
| 2005/0160406 | A1* | 7/2005 | Duncan | G06T 1/60 717/127 |
| 2005/0238259 | A1* | 10/2005 | Kim | H04N 5/235 382/312 |
| 2007/0001816 | A1* | 1/2007 | Lindley | G06K 7/10128 340/10.34 |
| 2007/0138375 | A1* | 6/2007 | Lee | H01L 27/14609 250/214 R |
| 2009/0225158 | A1* | 9/2009 | Kimoto | A61B 1/00009 348/77 |
| 2010/0091158 | A1* | 4/2010 | Yamashita | H04N 5/353 348/300 |

(Continued)

*Primary Examiner* — Aurel Prifti
(74) *Attorney, Agent, or Firm* — IP & T Group LLP

(57) ABSTRACT

A CMOS image sensor includes a hardware-implemented timing signal generation module that generates a timing signal based on a timing pattern generated by a software-implemented timing pattern generation and control module.

4 Claims, 4 Drawing Sheets

(56) References Cited

U.S. PATENT DOCUMENTS

| | | | |
|---|---|---|---|
| 2011/0188748 A1* | 8/2011 | Adams, Jr. | H04N 9/045 382/167 |
| 2011/0290985 A1* | 12/2011 | Kume | H01L 27/14609 250/208.1 |
| 2012/0206633 A1* | 8/2012 | Huo | H04N 5/232 348/294 |
| 2012/0213407 A1* | 8/2012 | Haikin | G06F 17/30247 382/103 |
| 2014/0099005 A1* | 4/2014 | Mogi | G06K 9/00288 382/118 |
| 2014/0204232 A1* | 7/2014 | Wang | H04N 5/23229 348/222.1 |
| 2014/0231620 A1* | 8/2014 | Oike | H04N 5/335 250/208.1 |

* cited by examiner

CMOS IMAGE SENSOR HAVING A TIMING SIGNAL GENERATOR IMPLEMENTED USING BOTH HARDWARE AND SOFTWARE USING THE SAME

CROSS-REFERENCE TO RELATED APPLICATIONS

The present application claims priority of Korean Patent Application No. 10-2014-0004553, filed on Jan. 14, 2014, which is incorporated herein by reference in its entirety.

BACKGROUND

1. Field

Exemplary embodiments of the present invention relate to an apparatus and method for generating timing signals in a Complementary Metal Oxide Semiconductor (CMOS) image sensor, and a CMOS image sensor using the same, and more particularly, to an apparatus and method for generating timing signals based on an Application Specific Instruction Set Processor (ASISP), and a CMOS image sensor using the same. Non-limiting examples of the timing signals include a control signal for an analog processor and a pixel processor, and a control signal for an image processor, and so on.

2. Description of the Related Art

The structure of a Complementary Metal Oxide Semiconductor (CMOS) image sensor (CIS) may be divided into a pixel processing block, an analog processing block, an image processing block, and a digital processing block. In general, a timing signal generator of the digital processing block generates timing signals by using many registers, counters, and comparators, and transmits the generated timing signals to the pixel processing block, the analog processing block, and the image processing block. Non-limiting examples of the timing signals include a control signal for the analog processing block and the pixel processing block, a control signal for the image processing block, and so on.

Timing signal generators, as described above, are generally large circuits with high power consumption, because they generate timing signals by using many registers, counters and comparators.

Another reason a typical timing signal generator has a large and complicated circuit structure is because it has to generate timing signals not only for the actual driving of the pixel processing block and the analog processing block, but also for the testing thereof. Due to the bigger and more complicated circuit structure, it takes more time for the timing signal generator to be realized.

Also, since the typical timing signal generator has all of its functions implemented in hardware, its functions are fixed when the timing signal generator is designed and hardly changed. If another function needs to be added or a function needs to be modified, the corresponding hardware has to be changed. Therefore, the general timing signal generator has poor functional extensibility and flexibility.

For this reason, it would be beneficial to develop a timing signal generator that may be used in a CMOS image sensor, having functional extensibility and flexibility so that diverse functions may be easily added, and have high performance with small size and low power consumption.

SUMMARY

An embodiment of the present invention is directed to an apparatus and method for generating timing signals based on an Application Specific Instruction Set Processor (ASISP), and a Complementary Metal Oxide Semiconductor (CMOS) image sensor (CIS) using the same.

An embodiment of the present invention provides a timing signal generator having high functional extensibility, flexibility, and performance with a small size and low power consumption by generating timing signals based on an Application Specific Instruction Set Processor (ASISP), and a CMOS image sensor using the timing signal generator.

In accordance with an embodiment of the present invention, a timing signal generation apparatus includes a timing signal generation module suitable for generating a timing signal based on a timing pattern, a timing pattern generation and control module suitable for generating the timing pattern and controlling the timing signal generation module, and an interface module suitable for signal interface with a neighboring device.

In accordance with another embodiment of the present invention, a method for generating a timing signal includes loading software for generating a timing pattern in a microprocessor, generating a timing pattern by implementing the software in the microprocessor, generating the timing signal based on the timing pattern in the microprocessor, and outputting a control signal based on the timing signal in the microprocessor.

In accordance with yet another embodiment of the present invention, a CMOS image sensor includes a pixel processing block suitable for generating and outputting an analog pixel signal corresponding to incident light; an analog processing block suitable for comparing a value of the analog pixel signal outputted from the pixel processing block with a value of a ramp signal and outputting a digital pixel data; an image processing block suitable for performing image processing by using the digital pixel data; and a timing signal generator suitable for generating a timing pattern, generating a timing signal based on the timing pattern, and outputting the timing signal to a corresponding block among the pixel processing block, the analog processing block, and the image processing block through a combination of hardware and software based on a processor.

DETAILED DESCRIPTION

Figure 1:
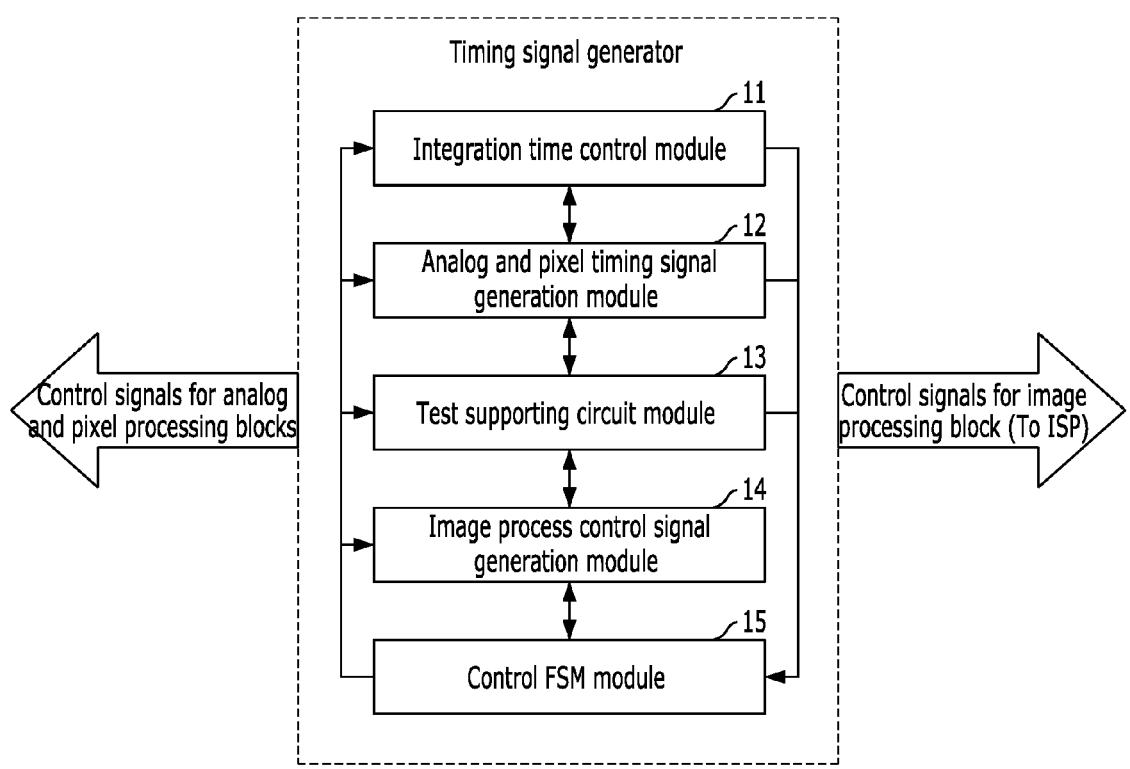
FIG. 1 is a functional block diagram illustrating a timing signal generator of a conventional CMOS image sensor.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts of the various figures and embodiments of the present invention.

When a detailed description of related prior art may obscure the communication of the present invention, the description has been omitted. Hereafter, preferred embodiments of the present invention will be described in detail with reference to the drawings in order to describe the concept and spirit of the present invention in detail so that those skilled in the art to which the present invention pertains may easily implement the concept of the present invention.

Throughout this patent specification, when one portion is 'connected' to another portion, it may mean not only a 'direct connection' but also an 'electrical connection' with yet another portion interposed between the two portions. Also, when a portion 'includes' or 'has' a certain constituent element, it does not exclude the presence of other constituent elements, unless it is mentioned otherwise, and it means that the portion may further include or have other constituent elements. Also, in this application, the singular form may include the plural form, and vice versa.

FIG. 1 illustrates functional modules of a timing signal generator of a conventional CMOS image sensor (CIS).

Referring to FIG. 1, the timing signal generator used in the conventional CMOS image sensor generally includes an integration time control module 11, an analog and pixel timing signal generation module 12, a test supporting circuit module 13, an image process control signal generation module 14, and a control finite state machine (FSM) module 15.

The integration time control module 11 controls how long the CMOS image sensor is to be exposed to light. The analog and pixel timing signal generation module 12 generates diverse forms of timing signals to be used for the analog processing block and the pixel processing block so that an appropriate timing control value (which is a control signal) for the analog processing block and the pixel processing block may be detected. The test supporting circuit module 13 supports a test for the analog processing block and the pixel processing block so that the test may be carried out easily. The image process control signal generation module 14 generates a control signal to be used for the image processing block. The control finite state machine (FSM) module 15 integratedly controls the integration time control module 11, the analog and pixel timing signal generation module 12, the test supporting circuit module 13, and the image process control signal generation module 14, based on the outputs of the integration time control module 11, the analog and pixel timing signal generation module 12, and the test supporting circuit module 13. The integration time control module 11 and the analog and pixel timing signal generation module 12 are implemented to exchange signals, and the analog and pixel timing signal generation module 12 and the test supporting circuit module 13 are implemented to exchange signals. The test supporting circuit module 13 and the image process control signal generation module 14 are implemented to exchange signals as well.

The timing signal generator used in the conventional CMOS image sensor shown in FIG. 1 generally uses many flip-flops, comparators, and registers to generate timing signals and transmit the generated timing signals to the pixel processing block, the analog processing block, and the image processing block.

The timing signal generator used in the conventional CMOS image sensor shown in FIG. 1 has a large circuit size and high power consumption because the timing signal generator uses many registers, flip-flops, comparators to generate the timing signals.

Also, the timing signal generator used in the conventional CMOS image sensor shown in FIG. 1 has a bigger and more complicated circuit structure because it has to be formed to generate the timing signals not only for the actual driving of the pixel processing block and the analog processing block, but also for the testing thereof. Due to this bigger and more complicated circuit structure, it takes a lot time for the timing signal generator to be realized.

Also, since the timing signal generator used in the conventional CMOS image sensor shown in FIG. 1 has its functions implemented in hardware, the hardware has to be changed if another function needs to be added or a function needs to be modified. Therefore, the functional extensibility and flexibility are poor.

To remove such concerns, an embodiment of the present invention provides a timing signal generator that may be used in a CMOS image sensor, having high functional extensibility and flexibility so that diverse functions may be easily added, and have high performance with a small size and low power consumption by generating the timing signals through a combination scheme of hardware and software based on an Application Specific Instruction Set Processor (ASISP).

To be specific, according to an embodiment of the present invention, the timing signal generator of the digital processing block has a hardware structure including an Application Specific Instruction Set Processor (ASISP), which is a microprocessor specialized for the timing signal generator, a Static Random Access Memory (SRAM) where software for generating timing signals is recorded, and a simple peripheral logic circuit for signal interface. The functions of generating signals and control are implemented in the form of software. In this manner the circuit size of the timing signal generator may be scaled down, and the timing signal generator may have lower power consumption and higher performance by using a clock gating scheme. As the timing signal generator for a CMOS image sensor is implemented based on a processor in accordance with the embodiment of the present invention, the operation circuits that are used for image correction may be implemented in the form of software.

Figure 2:
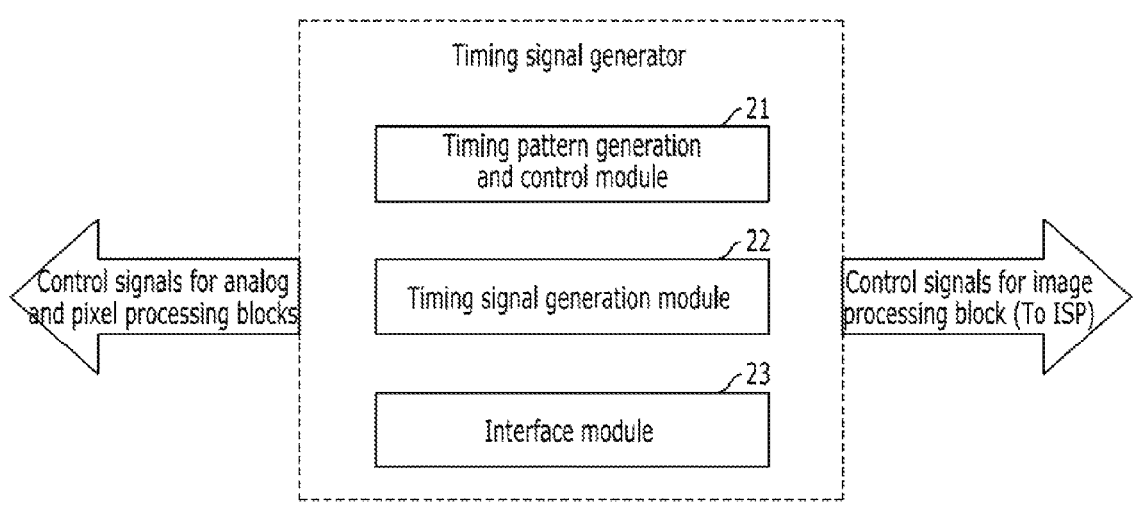
FIG. 2 is a block diagram illustrating a timing signal generator based on a processor in accordance with an embodiment of the present invention.

FIG. 2 is a block diagram illustrating a timing signal generator based on a processor in accordance with an embodiment of the present invention. FIG. 2 shows a timing signal generator that is implemented through a combination of hardware and software based on a process, which is an Application Specific Instruction Set Processor (ASISP).

Referring to FIG. 2, the processor-based timing signal generator in accordance with the embodiment of the present invention includes a timing pattern generation and control module 21, a timing signal generation module 22, and an interface module 23. The timing pattern generation and control module 21 generates a timing pattern and controls the timing signal generation module 22 based on the timing pattern. The timing signal generation module 22 generates timing signals based on the timing pattern generated in the timing pattern generation and control module 21. The interface module 23 is used for signal interface with a neighboring device.

The timing pattern generation and control module 21 is implemented in the form of software, recorded in a memory such as a Static Random Access Memory (SRAM), and loaded in and driven by the timing signal generation module 22 to generate a timing pattern and control the timing signal generation module 22.

The timing signal generation module 22 is implemented in the form of a microprocessor specialized for the timing signal generator, and generates timing signals based on the timing pattern obtained in the timing pattern generation and control module 21 and transmits the generated timing signals to a pixel processing block, an analog processing block, and an image processing block.

The interface module 23 is a simple peripheral logic circuit for signal interface with a neighboring device.

As described above, the timing signal generator in accordance with the embodiment of the present invention has a mixed structure of hardware and software. In other words, in this embodiment of the present invention, the timing signal generation module 22 is implemented in the form of a microprocessor specialized for the timing signal generator, and the timing pattern generation and control module 21 is formed as firmware (which is software) to control the microprocessor specialized for the timing signal generator, i.e., the timing signal generation module 22.

As a result, the complicated modules that were once formed as hardware may be implemented as a simple peripheral logic circuit and firmware, which leads to a remarkably decreased circuit size compared with conventional structures. Also, the functions may be modified or another function may be added by simply modifying the firmware.

Figure 3:
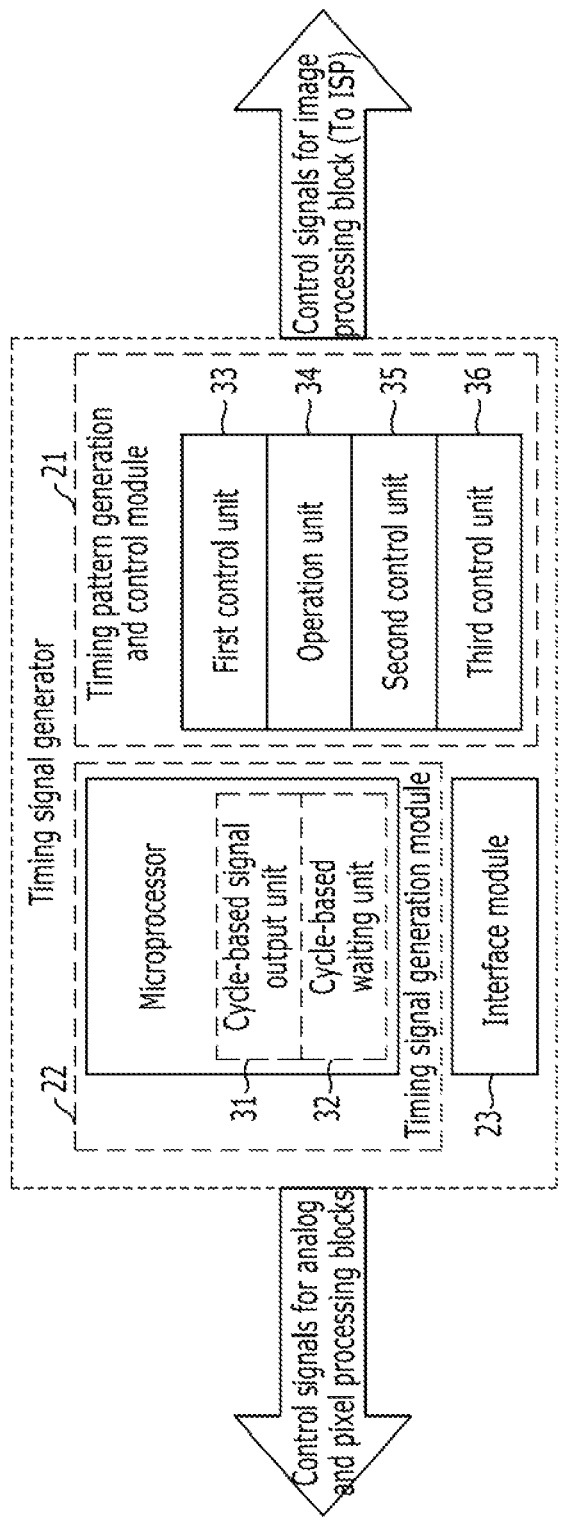
FIG. 3 is a detailed block diagram illustrating the timing signal generator based on a processor in accordance with an embodiment of the present invention.

FIG. 3 is a detailed block diagram illustrating the timing signal generator based on a processor in accordance with the embodiment of the present invention. FIG. 3 describes the timing pattern generation and control module 21 and the timing signal generation module 22 shown in FIG. 2 in detail.

Referring to FIG. 3, the timing signal generation module 22 includes a cycle-based signal output unit 31 for generating and outputting a timing signal on the basis of a clock cycle based on the timing pattern generated in the timing pattern generation and control module 21. The timing signal generation module 22 further includes a cycle-based waiting unit 32 for waiting (or sleeping and waking up) until a predetermined moment on the basis of a clock cycle under the control of the timing pattern generation and control module 21.

The timing signal generation module 22 implemented in the above-described structure includes a function of outputting a timing signal on the basis of a clock cycle in order to realize the timing signal generator, which in prior art is formed of hardware alone, in the mixed structure of hardware and software. In the embodiment of the present invention, a power-saving function of waiting (or sleeping and waking up) until a predetermined moment on the basis of a clock cycle is additionally provided to reduce power consumption. With the power-saving function, the microprocessor sleeps while no timing signals are needed, and when a timing signal is needed, the microprocessor wakes up under the control of the timing pattern generation and control module 21.

The cycle-based signal output unit 31 and the cycle-based waiting unit 32 are formed to operate (in other words, to generate timing signals) upon receipt of a command from the microprocessor, and the timing pattern generation and control module 21 generates a timing pattern for generating the timing signals and performs a control (in other words, makes a command) by using the command from the microprocessor. Since the timing pattern generation and control module 21 is implemented in the form of software, the hardware-originating technical limitation in generating timing patterns is removed, and thus diverse timing patterns may be generated.

Meanwhile, as illustrated in FIG. 3, the timing pattern generation and control module 21 includes a first control unit 33, an operation unit 34, a second control unit 35, and a third control unit 36. The first control unit 33 generates a timing pattern to be used for generating timing signals and controls the timing signal generation module 22 by using the command from the microprocessor. The operation unit 34 performs an operation for generating a timing signal and an operation for the interface module 23. The second control unit 35 controls the generation of the timing signals. The third control unit 36 controls a test operation.

As described earlier, the timing signal generator of a CMOS image sensor in accordance with the embodiment of the present invention is implemented based on a microprocessor to widen the range of utility, while securing functional extensibility and flexibility by realizing the timing pattern generation and control module 21 in the form of software. Herein, a cycle-based signal outputting function is added to the microprocessor specialized for the timing signal generator to realize the timing pattern generation and control module 21, which is purely hardware based in conventional technology, in the form of software. As described above, in the embodiment of the present invention, the timing pattern and the timing signals are generated using the command from the microprocessor and the software, and the typical hardware operation unit is substituted with an operation function of the microprocessor. In this way, the hardware-originating limitation may be removed, and the removal of hardware for generating the timing pattern may be accomplished. Additionally, the circuit size may be decreased, which is advantageous in terms of dimensions and power consumption.

Figure 4:
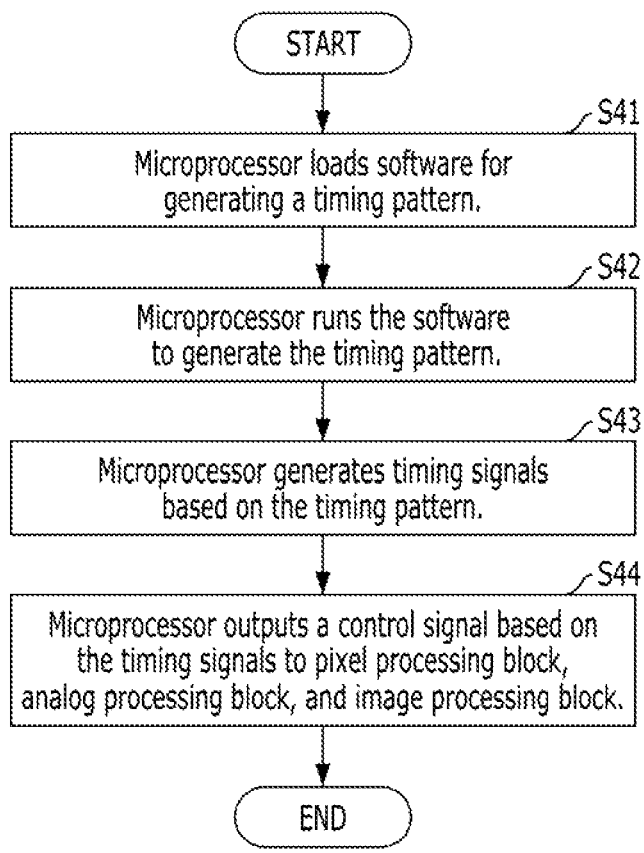
FIG. 4 is a flowchart describing a method for operating the timing signal generator based on a processor in accordance with an embodiment of the present invention.

FIG. 4 is a flowchart describing a method for operating the timing signal generator based on a processor in accordance with an embodiment of the present invention. Since the details have been described, the method of operation for generating the timing signals will be briefly described.

First, the microprocessor loads the software for generating a timing pattern in step S41.

In step S42, the microprocessor runs the software to generate the timing pattern.

In step S43, the microprocessor generates timing signals based on the generated timing pattern.

Subsequently, in step S44, the microprocessor outputs a control signal based on the generated timing signals to the pixel processing block, the analog processing block, and the image processing block.

Figure 5:
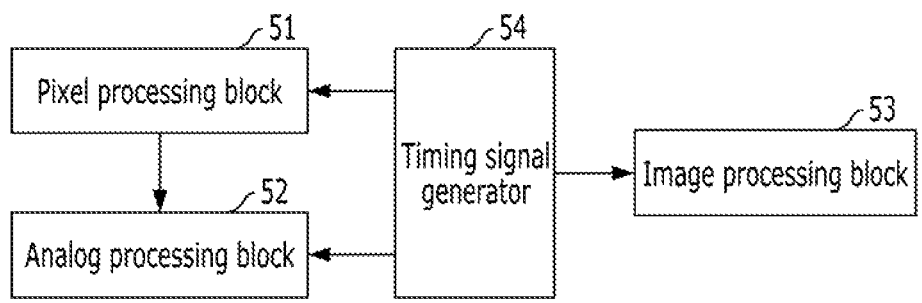
FIG. 5 is a block diagram illustrating a Complementary Metal Oxide Semiconductor (CMOS) image sensor (CIS) in accordance with an embodiment of the present invention.

FIG. 5 is a block diagram illustrating a CMOS image sensor (CIS) in accordance with an embodiment of the present invention. Referring to FIG. 5, the CMOS image sensor in accordance with the embodiment of the present invention includes a pixel processing block 51, an analog processing block 52, an image processing block 53, and a timing signal generator 54.

The pixel processing block 51 generates and outputs an analog pixel signal corresponding to incident light. The analog processing block 52 compares the value of the analog pixel signal outputted from the pixel processing block 51 with the value of a ramp signal Vramp in a differential mode and outputs a digital pixel data. The image processing block 53 performs an image processing based on the digital pixel data. The timing signal generator 54 is implemented in a combination of hardware and software based on a processor (which is an ASISP), generates a timing pattern, generates a timing signal based on the timing pattern, and outputs the generated timing signal to a corresponding block among the pixel processing block 51, the analog processing block 52, or the image processing block 53.

The pixel processing block 51, the analog processing block 52, and the image processing block 53 may be implemented according to known technology, and further descriptions on them are not provided herein. The timing signal generator 54 may be implemented as described with reference to FIGS. 2 to 4.

According to an embodiment of the present invention, since a timing signal is generated based on a processor, which is an ASISP, the timing signal may be generated in real-time by a timing signal generator with high performance while having a small size and low power consumption.

Also, according to an embodiment of the present invention, since the timing signal generator is implemented based on a processor, functional extendibility and flexibility of the timing signal generator may be improved.

To sum up, according to an embodiment of the present invention, since the timing signal generator for a CMOS image sensor is implemented in a combination of a processor and software, the functions of the timing signal generator may be modified and extended and/or another function may be added to the timing signal generator even after the circuit structure is formed. Moreover, since the constituent elements of the timing signal generator that are formed in hardware are removed, the size of the timing signal generator may be decreased by more than approximately 60%, or more than approximately 20% when the size of a memory for storing the software, such as an SRAM, is taken into consideration, compared with existing timing signal generators. In addition, the timing signal generator according to an embodiment of the present invention has the effect of reducing the power consumption by more than approximately 40%, compared with the existing timing signal generators. As a result, heat emission may be reduced by more than approximately 20%, which leads to improved image quality.

While the present invention has been described with respect to specific embodiments, it will be apparent to those skilled in the art that various changes and modifications may be made without departing from the spirit and scope of the invention as defined in the following claims.

What is claimed is:

1. A Complementary Metal Oxide Semiconductor (CMOS) image sensor, comprising:
   a timing signal generator including:
      a timing signal generation circuit having an Application Specific Instruction Set Processor (ASISP) which executes non-transitory medium that includes a cycle-based signal outputting unit and a waiting unit that sleeps or wakes the timing signal generation module based on a clock cycle;
      a first control unit which executes software to generate a timing pattern to control the cycle-based signal outputting function of the timing signal generation module to generate and output a timing signal based on the timing pattern when a command is received from the timing signal generation module;
      an operation unit which executes software that uses the timing pattern to generate a timing signal for an interface module and to control an operation of the interface module;
      a second control unit which executes software to control the generation of the timing signals; and
      a third control unit which executes software to control a test operation of the CMOS image sensor;
   a pixel processing block to receive the timing signal from the timing signal generator and generate an analog pixel signal based on light incident upon the CMOS image sensor and the timing signal;
   an analog processing block to receive the timing signal from the timing signal generator and to receive the analog pixel signal outputted from the pixel processing block and output digital pixel data based on a comparison of the analog pixel signal to a value of a ramp signal; and
   an image processing block to receive the timing signal from the timing signal generator and to receive the digital pixel data from the analog processing block, and perform image processing using the digital pixel data.

2. The CMOS image sensor of claim 1, wherein the timing signal generator further includes:
   an interface module having a peripheral logic circuit to interface with an external device.

3. The CMOS image sensor of claim 2, wherein the timing signal generation module further includes:
   an output unit to generate the timing signal based on a clock cycle that is based on the timing pattern generated in the timing pattern generation and control module.

4. The CMOS image sensor of claim 3, wherein the timing signal generation module further includes:
   a waiting unit to sleep or wake the timing signal generation module based on the clock cycle.

* * * * *